Feb. 19, 1963 W. O. THOMAS 3,078,090
AMUSEMENT RIDE

Filed Feb. 3, 1959 7 Sheets-Sheet 2

INVENTOR:
WILLIAM O. THOMAS
BY
ATTORNEY

Feb. 19, 1963 W. O. THOMAS 3,078,090
AMUSEMENT RIDE
Filed Feb. 3, 1959 7 Sheets-Sheet 3

INVENTOR:
WILLIAM O. THOMAS
BY
ATTORNEY

Feb. 19, 1963  W. O. THOMAS  3,078,090
AMUSEMENT RIDE
Filed Feb. 3, 1959  7 Sheets-Sheet 4

INVENTOR:
WILLIAM O. THOMAS
BY
ATTORNEY

Feb. 19, 1963 W. O. THOMAS 3,078,090
AMUSEMENT RIDE
Filed Feb. 3, 1959 7 Sheets-Sheet 5

INVENTOR:
WILLIAM O. THOMAS
BY
ATTORNEY

INVENTOR:
WILLIAM O. THOMAS

BY

ATTORNEY

3,078,090
AMUSEMENT RIDE
William O. Thomas, 3005 W. 66th Highway,
Springfield, Mo.
Filed Feb. 3, 1959, Ser. No. 790,908
37 Claims. (Cl. 272—29)

This invention relates to an amusement ride, and more particularly concerns an amusement ride of the portable type which may be readily transported between show locations.

Conventional portable rides are usually constructed of small, lightweight and otherwise easily manageable pieces so as to permit one or two men to handle the "set up" and "tear down" operations. In rides of substantial size having capacities of over twenty-five persons, however, such assembly and disassembly time runs quite high, often taking thirty or more man-hours. As a result, conventional portable rides, which usually require but one or two men for operation, often need additional help for "setting up" and "tearing down" so as to meet circuit schedules. Even with such additional help, however, the time involved can be reduced only to a limited extent because the construction is usually such as to permit but a single step-by-step sequence, and inexperienced help is slow and unreliable.

One of the objects of this invention is to overcome these and many other problems known to the prior art by the provision of a new and improved amusement ride which minimizes the man-hour assembly and disassembly time by folding and unfolding the major units thereof rather than utilizing a piece-by-piece handling technique.

Another object of this invention is to provide a new and improved amusement ride in which the platform base thereof forms the trailer portion of a tractor-trailer-truck assembly which is used to transport the ride between show locations.

Another object of this invention is to provide a new and improved amusement ride which is adapted to be folded up in such manner as to have a general dimensional outline no greater than that of a standard semi-trailer.

Another object of this invention is to provide a new and improved amusement ride in which the tractor that effects locomotion of the ride between locations is utilized as the source of power for raising and lowering the platform so as to assist in assembling and disassembling the ride.

Another object of this invention is to provide a new and improved amusement ride in which the engine thereof rotates along with the overhead sweeps which are driven by it.

Another object of this invention is to provide in an amusement ride a new and improved arrangement for coupling the rotational output of an engine, which is rotating with the overhead sweeps, to the passenger car sweep assemblies that are supported from the overhead sweeps, whereby planetary rotation of the passenger cars is effected.

Still another object of this invention is to provide in an amusement ride a new and improved passenger car construction having a foot guard that is foldable into the passenger area of the car and securable therein by the car safety door.

Another object of this invention is to provide in an amusement ride a new and improved linkage arrangement for controlling the gas feed and brake mechanisms in a rotating engine drive assembly.

A further object of this invention is to provide in an amusement ride a new and improved car sweep assembly having angularly disposed passenger car sweep arms, one of which may be raised, rotated and locked in the same vertical plane as the other car sweep arm.

Yet another object of this invention is to provide in an amusement ride a new and improved latching arrangement for securing a single-axle truck to a trailer platform.

It is also among the objects of this invention to provide a new and improved amusement ride which is simple yet safe in construction and operation and is well adapted to meet the demands of economic manufacture.

Other objects, features and advantages of my invention will become apparent from consideration of the following description taken in conjunction with the accompanying drawings, wherein like designators refer to the same or similar parts throughout and in which.

Figure 1:
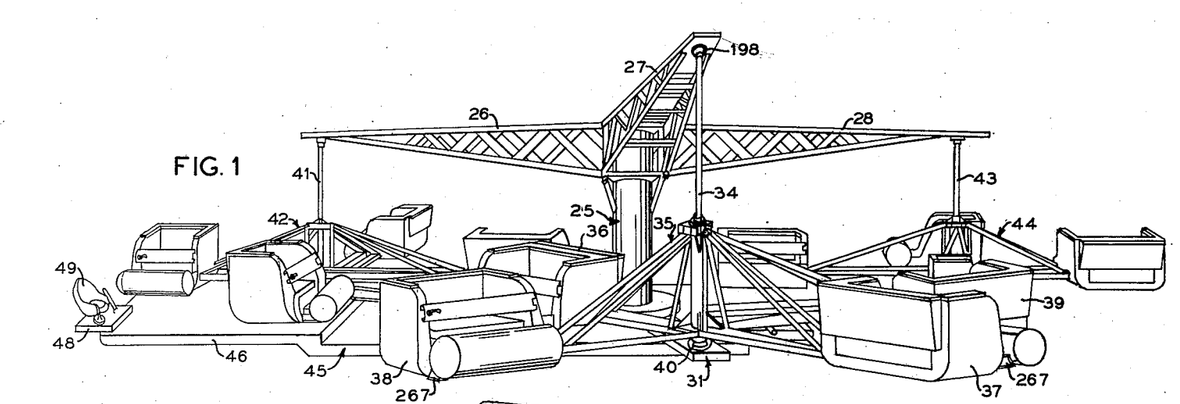
FIG. 1 is a perspective view showing the preferred form of amusement ride according to my invention set up on location and ready for operation.
Figure 2:
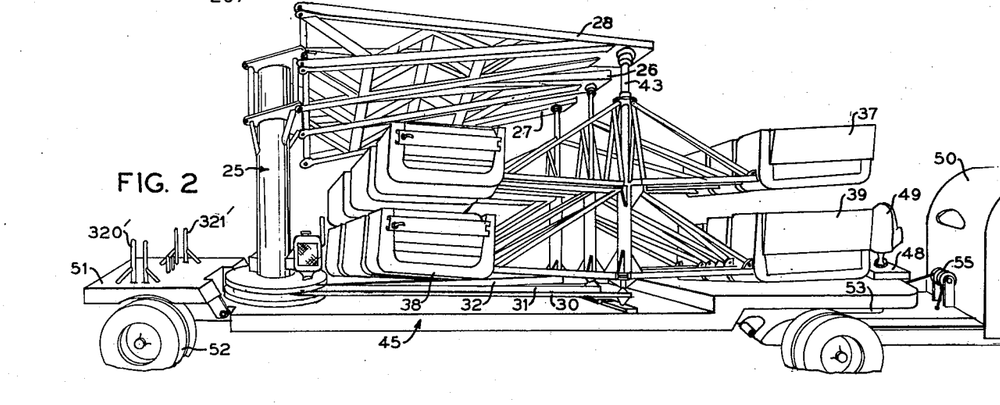
FIG. 2 is a perspective view showing the amusement ride of FIG. 1 but in folded configuration and supported, in accordance with my invention, at its rearward end by a single-axle truck and at its forward end by a tractor, whereby the ride is ready to be transported between locations.

Referring now more particularly to FIGS. 1 and 2 of the drawings, that form of the invention herein presented by way of example generally includes a center post 25 having three equally-spaced overhead sweeps 26, 27 and 28 and companion base sweeps 30, 31 and 32, respectively, therebelow. Each overhead sweep is in the form of a cantilever truss framework extending radially from the upper end of pole 25 in a generally horizontal plane. Rotatably supported from the free end of overhead sweep 27 is a pole 34 that extends downwardly to the base sweep 31, the latter being secured at the lower end of center pole 25. Supported radially from pole 34 is a car sweep assembly 35 including four equally spaced passenger cars, with pairs of opposite cars, such as cars 36 and 37 or 38 and 39, being joined together for balance. A drive mechanism, to be hereinafter described, couples power by way of sweep 31 from engine drive assembly adjacent center post 25 through a friction coupling 40 at the outer end of base sweep 31 to the lower end of pole 34.

This arrangement is such that upon rotation of overhead sweep 27 and its companion base sweep 31 with center post 25, and further rotation of pole 34, a planetary motion is imparted to car sweep assembly 35, with the result that each of the cars thereof defines a hypercycloidal path about the center pole 25. In like manner, rotatably secured between the outer ends of overhead sweep 26 and its companion base sweep 30 is a pole 41 for supporting a second car sweep assembly 42; and supported between overhead sweep 28 and its companion base sweep 32 is a pole 43 for supporting a third car sweep assembly 44, with the driving arrangement through the base sweeps 30 and 32 being similar to that through base sweep 31 so as to impart a similar planetary motion to the car sweep assemblies 42 and 44.

Center post 25 is supported from a generally horizontal platform 45 that forms the main body member of a trailer assembly. The forward end of the trailer platform is formed with an offset portion 46 on which is pivoted at 47 a base 48 supporting an operator's seat 49. As shown most clearly in FIG. 2, the forward end of trailer platform 45 is adapted to be coupled to a tractor 50, and the rearward end of platform 45, is adapted to selectively receive a single-axle truck 51 having wheels 52. Conventional tractor-trailer coupling 53 is provided on the underside of offset portion 46 and at the rear of a tractor 50 to permit the selective engagement of platform 45 and tractor 50, with the manner of lowering and raising to and from the tractor 50 and truck 51 to be hereinafter described in detail.

In preparing the ride for transportation, the car sweep assemblies are first folded so that the sweep arms of each are vertically coplanar. This is generally accomplished by lifting one pair of cars in each sweep assembly upwardly and rotating it 90° about its supporting pole. For example, cars 36 and 37 in car sweep assembly 35 may be slid upwardly on pole 34 and rotated into alignment with cars 38 and 39 therebelow, as will be hereinafter described in more detail. Two of the overhead sweeps, such as sweeps 27 and 28, along with their companion base sweeps are next partially detached from center post 25 and swung forwardly to be in an adjacent parallel position with overhead sweep 26 and its companion base sweep. Platform 45 is then raised by winch 55, as will hereinafter be seen, and secured between truck 51 and tractor 50 so as to assume the reduced configuration of FIG. 2, thereby permitting the ride to be transported as readily as a conventional tractor-trailer.

*Center Support Arrangement*

Figures 3, 4:
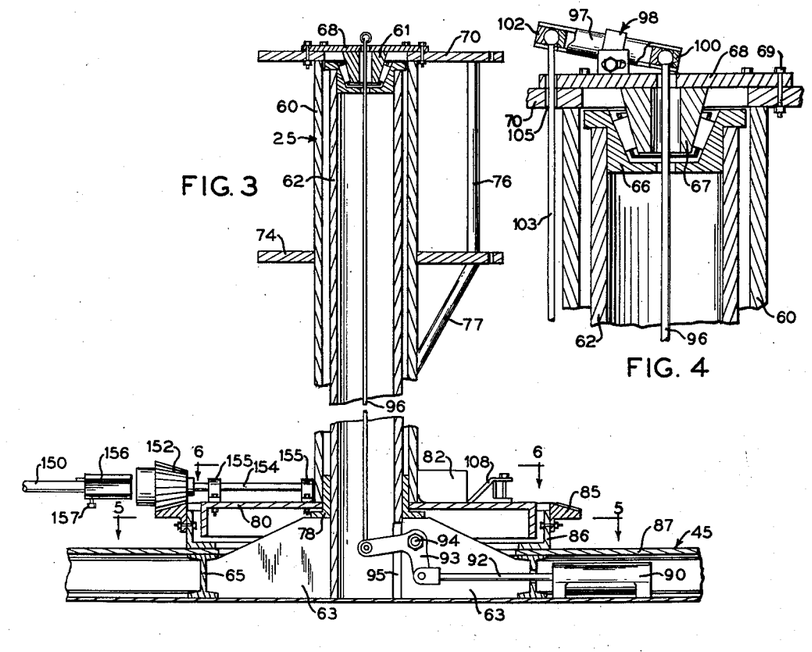
FIG. 3 is a vertical cross sectional view, partly broken away, showing the center support arrangement.
FIG. 4 is an enlarged, cross sectional detail showing the main support bearing of FIG. 3 but taken at right angles thereto.
Figure 5:
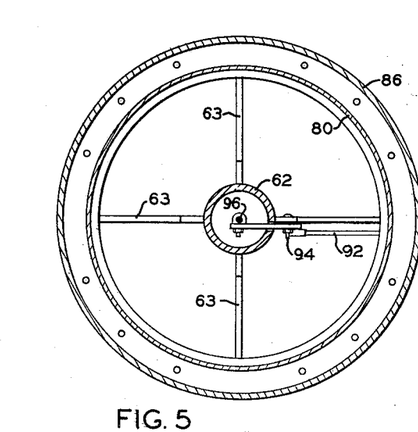
FIG. 5 is a horizontal cross sectional view taken along line 5—5 of FIG. 3.

Referring now more particularly to FIGS. 3 and 4, it can be seen that center post 25 has an outer sleeve 60 rotatably supported by a bearing 61 from the upper end of inner tubular standard 62, the latter being secured at its lower end by the four radial base plates 63 to the framework 65 of platform 45. Bearing 61 is of the taper roller type, with its conical apex disposed downwardly, having an outer race 66 fitted to the upper end of tubular standard 62, and an inner race 67 on which is welded the annular top plate 68. Supported from top plate 68 by bolts 69 is a large centrally-apertured triangular plate 70 to the apexes of which the upper pair of chords 72 of each overhead sweep are adapted to be detachably secured, as by bolts or pins 71, seen in FIG. 16, the arrangement being such that adjacent chords of adjacent sweeps are adapted to be secured to the same apex by the outwardly angled ears 73. The outer sleeve 60 of center post 25 is welded to the underside of triangular plate 70, extending downwardly therefrom for termination just short of the standard base plates 63. Welded to sleeve 60 below the plate 70 is a second plate 74 of triangular outline, being suitably apertured at the apexes so as to releasably secure the lower pair of chords of the truss framework of each overhead sweep by bolts or pins, in a manner similar to securement of the upper chords. Between the upper and lower triangular plates 70 and 74, respectively, are welded bracing rods 76, and for further support the struts 77 extend between the lower side of plate 74 to the sleeve 60.

Standard 62 has an annular brass bushing 78 supported on the upper edges of base plates 63, extending upwardly therefrom so as to provide a bearing surface between standard 62 and rotatable sleeve 60. Concentrically welded to the lower end of center post sleeve 60 is an annular table 80 which supports the engine drive assembly as will hereinafter be seen. Table 80 is further supported from sleeve 60 by the stub channel beams 81, 82 and 83 which are each welded to the sleeve 60 and topside of table 80. Ring gear 85 is supported on the platform 45 just clear of annular table 80, being bolted to the annular rim 86 which is welded to the floor plates 87 that are secured to the I-beam framework 65 of platform 45.

Figure 26:
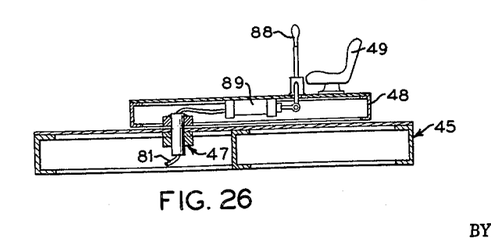
FIG. 26 is a transverse section of the forward end of the ride platform showing the base extension and operator's control station thereon.

Control linkage is provided between stationary platform 45 and rotatable table 80 so as to permit brake and gas control of the engine drive assembly which is mounted on table 80 for rotation therewith. For this purpose, a control lever 88 adjacent the operator's seat actuates a remote master cylinder 89 which operates the slave cylinder 90 by way of hydraulic line 81, as shown most clearly in FIG. 26. Slave cylinder 90 is mounted under floor plates 87 to the platform framework 65, having piston rod 92 attached to one end of crank arm 93 which is pivotally supported at 94 on one of the standard base plates 63. The other end of crank arm 93 passes through a slot 95 in the side wall of tubular standard 62 for securement centrally therein to the rod 96 which passes coaxially upwardly through the entire length of tubular standard 62, extending through central apertures in bearing 61 and top plate 68 to one side of radial rocker arm 97 in a ball swivel assembly 98.

Rod 96 is provided at its upper end with a ball-like termination which is secured in the bearing socket 100 at the innermost radial end of rocker arm 97, the latter being centrally supported by a pivot mount on top plate 68. The outer end of rocker arm 97 has a bearing socket 102 that secures the ball-like upper termination of depending rod 103 which passes downwardly through apertures 105 in top plate 68 and triangular plates 70 and 74 on the outside of center post sleeve 60. It can be seen, then, that the arrangement is such as to permit a linear coupling of movement of the operator's hand lever 88 through the rotary connection of swivel assembly 98 so as to provide for gas and brake control to the engine which rotates along with the overhead and base sweeps, as well as the outer sleeve 60 of center post 25, as will hereinafter be seen.

Welded to table 80 are three equally spaced brackets 106, 107 and 108, with adjacent brackets being adapted to each secure one of the base sweeps. The inwardly radial ends of side frame members 110 and 111 of the truss framework of each base sweep is formed with an eye so as to provide for coupling by a pin 115 in its respective bracket. This arrangement is such that upon folding of the ride, brackets 106 and 107 are fixed pivotal points for the sweeps 31 and 32, with bracket 108 being provided with a releasable pin 116 which permits base sweeps 31 and 32 to be folded against sweep 30 in a manner similar to folding of their companion overhead sweeps 26 and 28, respectively.

Engine Drive Assembly

Figure 6:
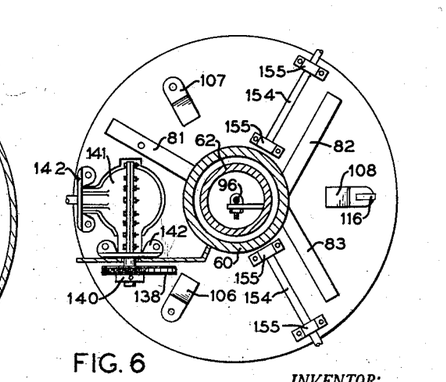
FIG. 6 is a horizontal cross sectional view taken along line 6—6 of FIG. 3.
Figure 7:
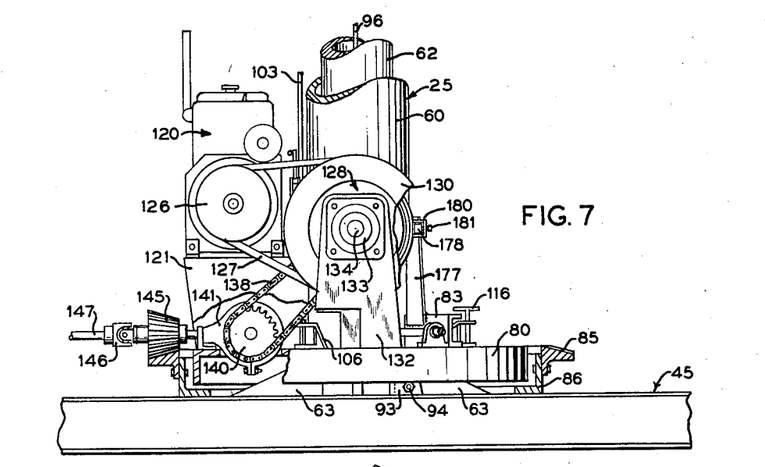
FIG. 7 is a side elevation, partly broken away, showing the engine drive assembly at the base of the center post.
Figure 8:
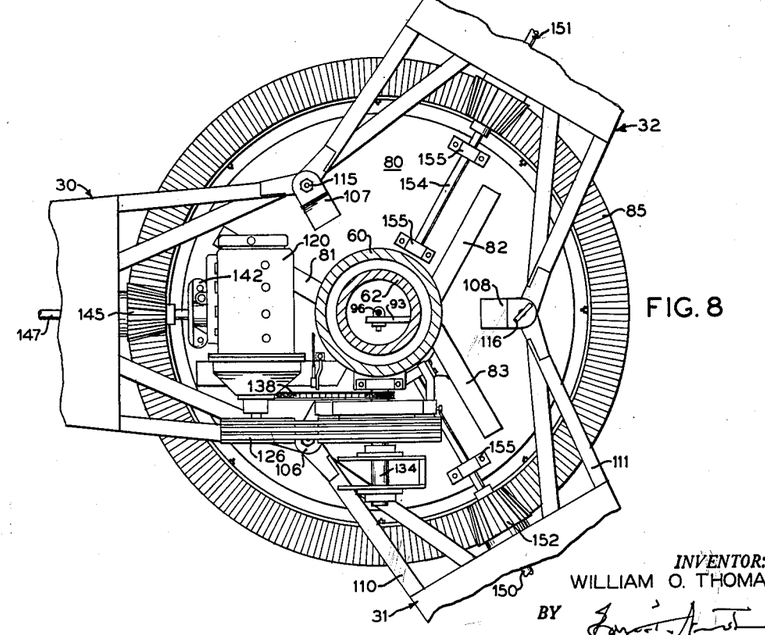
FIG. 8 is a plan view of the apparatus in FIG. 7, but in addition, showing the securing arrangement for the base sweeps.

Considering the engine drive assembly as shown in detail in FIGS. 6, 7 and 8, conventional gasoline engine 120 is supported from table 80 for rotation therewith by rear mount 121 and channel member 81. Engine 120 couples rotary power by way of drive shaft sheave 126 through belt 127 to the conventional fluid coupling unit 128, the latter having a peripheral sheave 130 receiving belt 127 and a brake band assembly 131 thereon for limiting the rotary motion coupled through the fluid unit from engine 120. Fluid coupling unit 128 is supported from table 80 by the upstanding support member 132, having bearings 133 therein for rotatably supporting the center shaft 134 of the fluid coupling unit. Rotary power is taken from fluid coupling unit 128 by link chain 138 which effects rotation of sprocket 140 of right angle drive 141 that is mounted under engine 120 on table 80 by brackets 142. Right angle drive 141 effects rotation of the bevel pinion 145 which meshes with platform mounted ring gear 85 to cause the entire engine drive assembly, including engine 120, fluid coupling unit 128 and outer sleeve 60 of center post 25 to rotate about the inner stationary standard 62.

Secured to the outer side of bevel pinion 145 by universal coupling 146 is the car sweep drive rod 147 being channeled through the truss framework of base sweep 30 so as to transmit rotary power to car sweep 42 by way of a friction coupling at the base thereof, as will hereinafter be seen. Rotation of car sweeps 35 and 44 is effected by drive rods 150 and 151, respectively, which are identically supported and driven for this purpose. For example, bevel pinion 152 is caused to mesh with ring 85 by having an inwardly disposed radial support rod 154 that is rotatably mounted on table 80 by pillow blocks 155. As shown most clearly in FIG. 3, bevel pinion 152 is releasably secured to car sweep drive rod 150 by having keyed thereto a sliding hex head 156, positioned by anchor screw 157, to be received in the enlarged hex mouth of bevel pinion 152.

From this arrangement it can be seen that the entire engine drive assembly, including engine 120, fluid coupling unit 128, and right angle drive 141 rotates along with the table 80, outer sleeve 60 and the overhead and base sweeps, while effectively coupling rotary power to each of the car sweeps 35, 42 and 44 so that each car travels a helicoidal path about center post 25.

Figure 9:
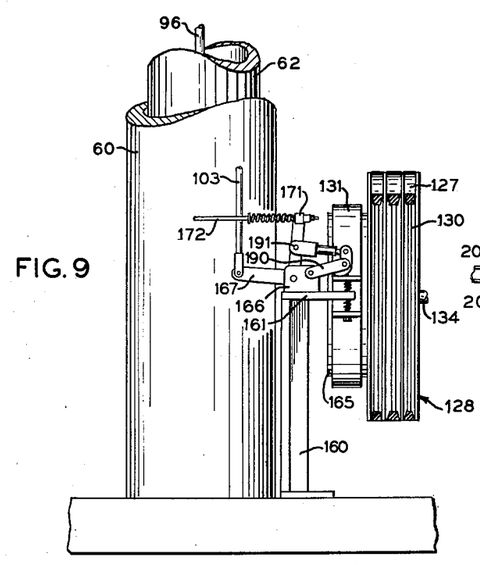
FIG. 9 is a detail side elevation, partly broken away, showing the drive sheave, gas feed and brake mechanism of the engine drive assembly.
Figure 10:
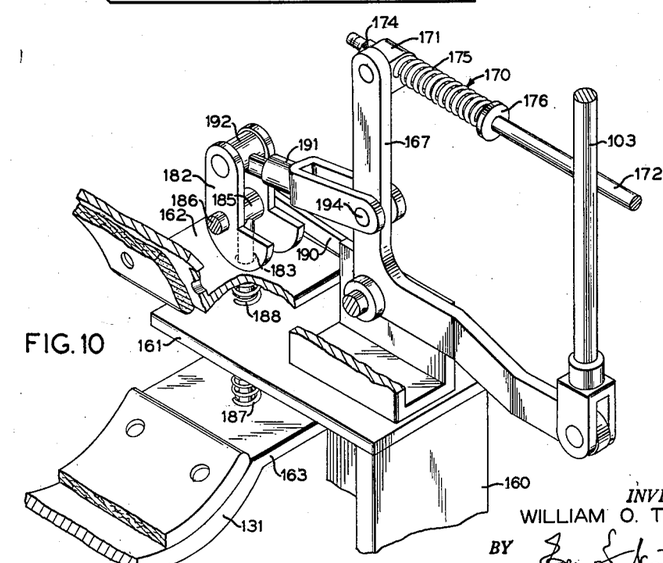
FIG. 10 is an enlarged fragmentary perspective view showing the control arrangement for the gas feed and brake mechanisms.
Figure 11:
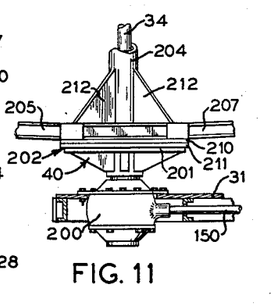
FIG. 11 is a detail elevation, partly broken away, showing the car sweep friction coupling at the outer end of a base sweep for driving a car sweep assembly.
Figure 12:
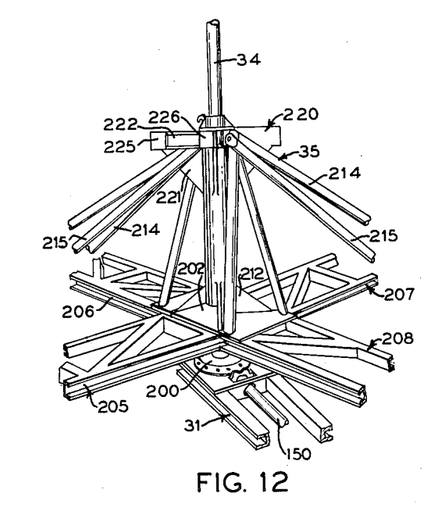
FIG. 12 is a detail perspective view of a car sweep assembly showing the vertically positionable sweep arms locked in the operational position.
Figure 13:
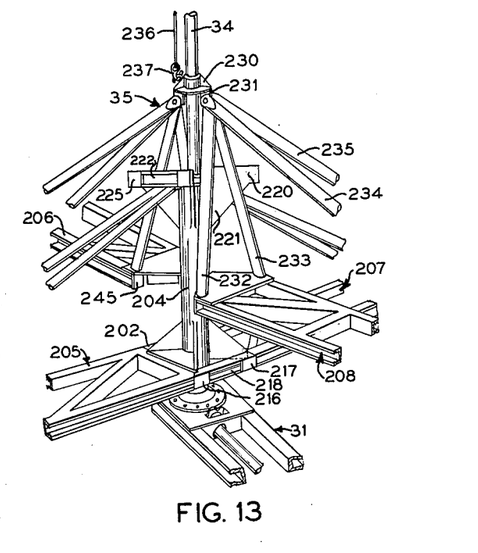
FIG. 13 is a perspective view similar to FIG. 12 but with the vertically positionable car sweep arms being raised into transporting position.
Figure 14:
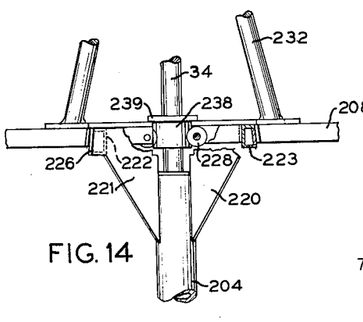
FIG. 14 is a detail elevation, partly broken away, showing the upper locking assembly with the vertically positionable car sweep arms locked in position to be transported.

FIGS. 9 and 10 illustrate the gas and brake control arrangement for the engine drive assembly. For this purpose, upright support 160 is mounted on table 80 and generally includes a horizontal flange 161 at the upper end thereof which extends between the upper and lower free ends 162 and 163, respectively, of brake band 131, that envelopes the brake drum 165 which is the output member of fluid coupling unit 128. Horizontal flange 161 has mounted thereon U-shaped bracket 166 between the arms of which a bell crank 167 is pivotally secured. Control rod 103 from swivel assembly 98 atop center post 25 terminates at its lower end by being pivotally connected to one end of bell crank 167, the other end of the bell crank being pivotally secured to a gas feed linkage 170. This arrangement is such that the fitting 171 is pivotally secured to the upper end of bell crank 167 and provided with an aperture through which the gas feed control rod 172 passes to be adjustably positioned therebeyond by nut 174. Spring 175 is guided on rod 172 for compression between fitting 171 and annular shoulder 176, so that pivoting of bell crank 167 in one direction causes gas feed rod 172 to follow therewith, but pivoting in the other direction compresses spring 175 and effect no movement of gas feed linkage rod 172. During this lost motion compression of spring 175, actuation of the brake linkage takes place, as will now be seen.

Brake band 131 is supported at one end from table 80 by way of support 177 and cross arm 178 that is received within the U-shaped projection 180 halfway along the periphery of brake band 131, as shown most clearly in FIG. 7. Adjustment of the band with respect to the brake drum to compensate for wear is provided in conventional manner by the screw 181. Spaced braking cams 182 effect closure of the brake band 131 about brake drum 165. For this purpose, bolt 183 extends upwardly through the lower brake band ear 163, main support flange 161 and upper brake band ear 162, for securement thereabove in the collar 185 that is rotatably supported on cross pintle 186 between cams 182. Spring 187 is provided between the lower brake band ear 163 and flange 161, and a spring 188 is provided between the flange 161 and the upper brake band ear 162, with bolt 183 passing through both springs so as to normally maintain the brake band in spread disposition. Braking cams 182 are retained in position by a pair of stabilizer arms, as at 190, extending from the cross pintle 186 to the sides of the U-bracket 166. Pivoting of the L-shaped cams 182 about pintle 186 is effected by the actuating arm 191 having one end pivotally secured, as at 192, to the upper end of braking cams 182. The other end of actuating arm 191 is pivotally secured, as at 194, to an intermediate point on the upright arm of the bell crank 167, so that downward movement of the control rod 103 causes the braking cams 182 to cooperate with bolt 183 to force the brake band ears 163 and 162 together so as to close the band 131 upon the brake drum 165.

From the foregoing construction it can be seen that actuation of the operator's control lever 88 effects a like, but vertical movement of the rod 103, with the result that continued movement of rod 103 effects release of the brake at a predetermined point and then begins to feed gas to the engine to speed up rotation thereof. Return of operator's lever 88 and thus rod 103 to normal position decreases the gas feed to idle and thereafter increases the braking action of band 131 until no rotation from engine 120 is permitted to pass through fluid coupling unit 128.

Car Sweep Assemblies

Referring now more particularly to car sweep assembly 35 as depicted in FIGS. 11 to 15, it being understood that sweep assemblies 42 and 44 are identical, it will be seen that the entire assembly is rotatably supported between the outer ends of overhead sweep 27 and base sweep 31 on a rotatable pole 34. Pole 34 depends from overhead sweep 27 by bearing 198, being driven at its lower end by the friction coupling 40. This arrangement is such that rotation of drive rod 150 from ring gear 85 is coupled through right angle drive 200 to annular pressure place 201. Resting on pressure plate 201 is the friction base 202 of the pole sleeve 204, the latter supporting the radial sweep arms 205, 206, 207 and 208 that have the cars 36, 37, 38 and 39 thereon, respectively, the friction coupling arrangement being such as to provide a slippage proportional to both acceleration and de-acceleration of the planetary motion transmitted to the cars, so as to reduce shock to the car sweeps and riders during starting and stopping of the ride.

Figure 15:
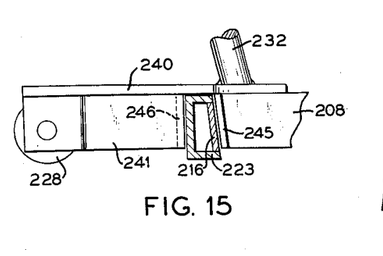
FIG. 15 is an enlarged detail of the inner end of one of the vertically positionable car sweep arms, showing the wedge locking arrangement.

Friction base 202 is of square outline being formed by channels having welded to the underside thereof the square base plate 210 under which the friction facing material 211 is riveted. Fillet plates, as at 212, are welded between the corner of the base to the pole sleeve 204, so that rotation of pressure plate 201 effects rotation of base 202 and sleeve 204. Secured to one set of opposing parallel sides of base 202 are the truss framework sweep arms 205 and 207, with guys, as at 214 and 215, extending from the upper end of sleeve 204 to the outer end of each sweep arm adjacent its passenger car, hereinafter to be described in more detail with respect to FIG. 17. The other set of opposing sides of base 202 has spaced side plates 216 and 217 closing the outwardly opening locking channels 218 of the base, the arrangement being such as to form a pair of upwardly tapering wedges, as shown in FIG. 15, for locking thereon of the vertically positionable car sweep arms 206 and 208, as will hereinafter be seen.

The upper end of sleeve 204 has secured thereto the spider 220 including four equally spaced triangular plates 221, having outwardly opening locking channels 222 and 223 secured across the upper ends of adjacent plates above sweep arms 205 and 207, respectively. This arrangement is such that the channels 222 and 223 close one set of opposing sides of the spider while the other set of opposing sides is open to permit passage therethrough of the vertically positionable sweep arms 206 and 208, as will hereinafter be seen. Closing each of the outwardly opening channels 222 and 223 are a pair of spaced side plates 225 and 226, similar to side plates 216 and 217 on the base 202, so as to form a pair of upwardly tapering wedges for locking of the vertically positionable car sweep arms 206 and 208 thereon after being lifted above spider 220 and swung 90°, as will now be seen.

Referring now particularly to vertically positionable sweep arm 208, it being understood that sweep arm 206 is of symmetrically balanced configuration, it can be seen that the innermost portion thereof is provided with a roller 228 of hyperboloidal configuration so as to permit vertical rolling registration with sleeve 204. Slidably positioned on pole 34 above sleeve 204 is the collar 230 having a pair depending, oppositely directed ears, as at 231. Secured to one of the ears 231 are two sets of guys with guys 232 and 233 being secured to the inner end of the sweep arm 208, and guys 234 and 235 being secured to the outer end thereof just inside passenger car 37. To raise sweep arm 208 from locking engagement with base 202, a line 236 is secured to hook 237 on collar 230 from a suitable hand winch (not shown). Sliding of collar upwardly along the pole 34 causes guys 232, 233, 234 and 235 to pull sweep arm 208 upwardly, with roller 228 riding on sleeve 204. As sweep arm 208 reaches the upper end of sleeve 204, roller 228 moves onto the bushing 238, whereupon further upward movement causes the bushing to move upwardly because of the engagement of the top side of sweep arm 208 with the shoulder 239 on the upper end of bushing 238. Upon clearing the upper end of spider 220, sweep arm 208 may be rotated or swung 90°, with bushing 238 rotating therewith, and then lowered into locking engagement with spider 220.

Figure 20:
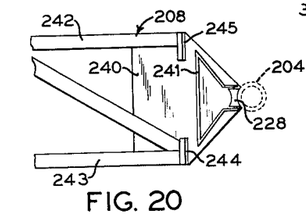
FIG. 20 is a bottom plan view of the inner radial end of a car sweep arm.

These locking arrangements can be understood more readily by reference to FIG. 20 where it can be seen that a support plate 240 is welded to the upper side of the inner end of the truss framework of sweep arm 208. The innermost end of the plate 240 is formed with inwardly tapering sides so as to be freely receivable between adjacent fillet plates 221 and through one of the open sides of spider 220. Welded to the underside of plate 240 is the depending bracing rim 241 of generally triangular outline. The innermost apex of bracing rim 241 is opened so as to rotatably support the roller 228.

The side frame members 242 and 243 of sweep arm 208 have transversely welded to the innermost ends thereof the face plates 244 and 245, respectively, each tapering inwardly and upwardly. The base portion 246 of triangular bracing rim 241 is generally upright and spaced inwardly parallel from face plates 244 and 245 so as to form an elongate slot for selectively receiving between the base and the side plates either the locking channels 218 of base 202, or the locking channels 222, 223 of spider 220, the arrangement being such that face plates 244 and 245 of sweep arm 208 wedge into locking registration with the side plates 216 and 217, respectively, when sweep arm 208 is in lower position, and with side plates 225 and 226 of spider 220 when sweep arm 208 is in its raised position. It will be recognized that this arrangement has considerable utility, providing not only for maximum strength and safety when in operation, but also permitting a highly stable folded position to minimize vibration of the sweep arms during transportation.

Passenger Car Construction

Figure 17:
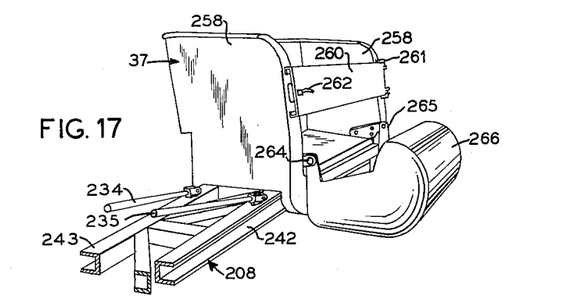
FIG. 17 is a perspective view of a car sweep arm with a passenger car attached thereto.
Figure 18:
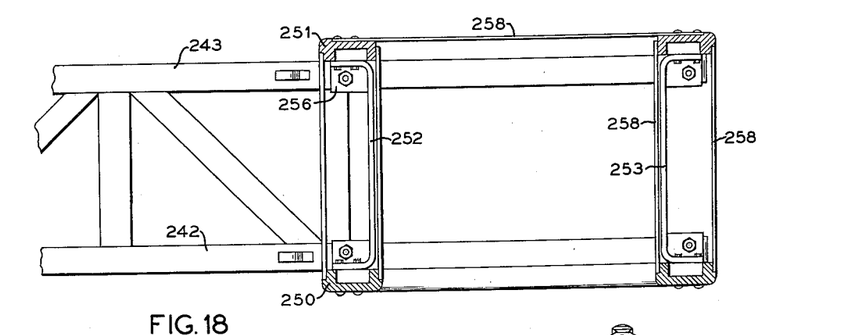
FIG. 18 is a horizontal cross section of the car shown in FIG. 17.
Figure 19:
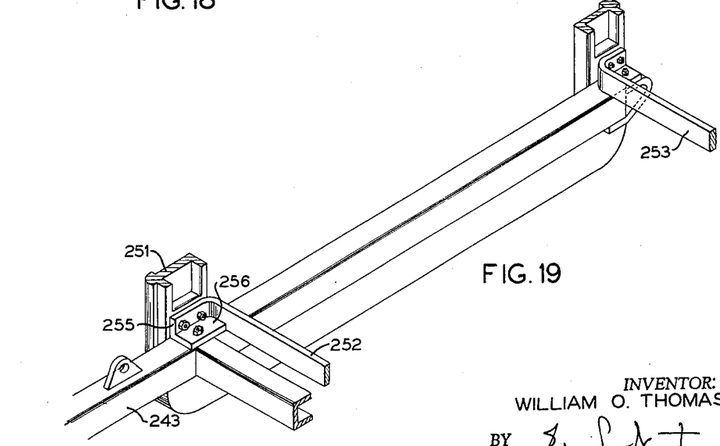
FIG. 19 is a detail perspective view showing how a car sweep arm is attached to one of the main frame members of a passenger car.

Referring now more particularly to passenger car 37, it being understood that the other passenger cars are identical, it can be seen from FIGS. 17–19 that the side frame members 242 and 243 of sweep arm 208 are the main supporting members for the car 37. The basic framework pieces of car 37 are front and rear U-shaped frames 250 and 251, being supported by side frame members 242 and 243, respectively. For this purpose, the cross arms 252 and 253 extend between the U-shaped frames at each side of the car. Considering arm 253, it being understood that arm 253 is similar, it can be seen that arm 252 terminates in flange 255 which is bolted to rear U-frame 250. Flange 255 has welded thereto a base flange 256 which is bolted to the top of side frame member 243 of sweep arm 208, the arrangement being such that flanges 255 and 256 form a bracket for securing rear car frame 250 to the side frame member 243 of the sweep arm. The front and rear U-frames are held upright by suitable cross arms, similar to cross arm 252, and are suitably provided with inner and outer sheet metal panels, as at 258, to complete the three sided seat-like configuration. A narrow safety door 260 is provided across the open side of the car, being hinged to one side, as at 261, and provided with a handle securing arrangement on the other side, as at 262.

Pivoted, as by the side hinges 264 and 265, to the open side of the car is the foot guard 266 which is such configuration as to be receivable into the interior of the car for securement therein by safety door 260 during transportation of the ride. Foot guard 266 is provided with a step 267 on the outer side thereof, as shown in FIG. 1, to facilitate entry and exit by passengers. It will be seen that the provision of such foldable cars minimizes the spacing required between the sweep assemblies in their vertical coplanar configuration, when the overhead and base sweeps are swung to folded position over the platform.

Tractor and Truck Arrangement

Considering now the arrangement for lowering and raising platform 45 to and from the ground, as noted with respect from FIGS. 1 and 2 truck 51 is adapted to support the rearward end of the platform, and tractor 50 is adapted to support the forward end. Truck 51 has a conventional wheel and axle assembly, generally indicated at 270, supporting a floor 271, the forward end of which is adapted to be secured to the reduced rearward end of platform 45 by a plurality of spaced latching mechanisms. For this purpose, welded to side frame members at the forward end of floor 271 are a first pair of depending keepers, as at 272, and spaced rearwardly therefrom but similarly secured are a second pair of depending keepers, as at 274, the arrangement being such that each keeper is adapted for selective engagement with a transverse support pin on the rearward end of the platform. As shown most clearly in FIGS. 21 and 22, each end of the rear cross beam 275 of the platform has welded thereto an extension bracket, as at 276, each having spaced members 277 and 278 with the transverse support pin 280 therebetween. Spaced inwardly from the rear of the platform are a pair of outwardly extending support pins, as at 281, each being welded to one of the platform side frame members.

Figure 23:
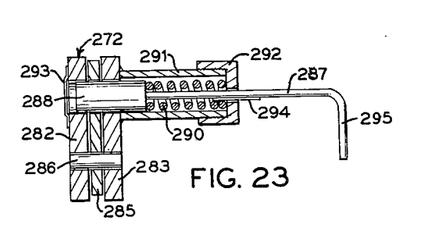
FIG. 23 is a horizontal section of one of the forward truck latching mechanisms.
Figure 24:
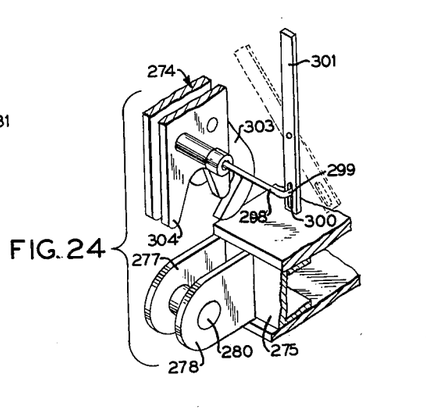
FIG. 24 is a detail perspective of one of the rear truck latching mechanisms.
Figure 25:
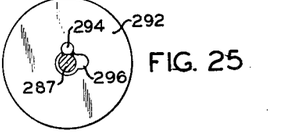
FIG. 25 is an enlarged end elevation of the keeper of FIG. 23, partly broken away, showing the arrangement for securing the keeper in open position.

These latching mechanisms may be more readily understood by reference to FIGS. 23 and 24. FIG. 23, which is in horizontal section, shows the forward keeper 272 as being formed from two spaced keeper plates 282 and 283 each having a downwardly opening mouth portion. Slidable between keeper plates 282 and 283 is a hook plate 285 supported on pivot pin 286, the arrangement being such that said hook plate is adapted to selectively close said mouth. Pivotal movement of the hook plate 285 is permitted by outward movement of the hand release lever 287 that pulls locking pin 288 against spring 290 in the spring housing 291 which is fixed to keeper plate 283, the arrangement being such that spring 290 is retained in housing 291 by the apertured nut 292. Cover 293 on keeper plate 282 limits the spring-urged movement of locking pin 288. Release lever 287 has welded therealong a key 294, which permits the locking lever to be retained in its removed position by rotation of the lever handle 295 after it has been pulled sufficiently far through the keyway 296 so that key 294 clears the top of the retaining nut 292. Thereupon, release of lever 287 causes key 294 thereof to abut the outside of retaining nut 292, thereby preventing compressed spring 290 from pushing locking pin 288 into position across the keeper plates. This permits hook plate 285 to pivot freely between keeper plates so that mounting pin 281 may force or cam the hook plate out of locking position. It is to be noted, however, that return of locking pin across the keeper plates with the hook plate out of locking position will lock the keeper in open position, as is the mode of operating the rearward keepers 274 shown in FIG. 24. In this arrangement it can be seen that locking pin control arm 298 has a return-bent portion 299 that is retained in an elongate slot 300 in the lower end of lever 301 has a return-bent portion which is pivoted to a side frame member of the truck floor, as at 302, and extends freely therethrough for actuation thereabove by the operator. With the floor 271 of the truck tilted forwardly, the hook plate 303 of keeper 274 pivots by gravity to an open position when the locking pin removed from across the keeper plates 304 as by actuation of lever 301. Return of the locking pin across keeper plates 304 thereafter locks hook plate 303 in open position.

Figure 21:
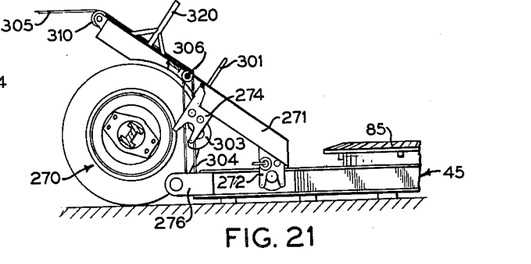
FIG. 21 is a side elevation, partly broken away, showing the truck with its latching and hoisting mechanism for raising and lowering the ride platform from and to the ground.
Figure 22:
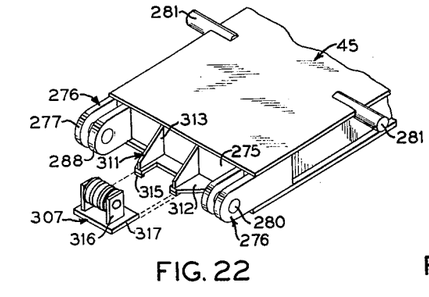
FIG. 22 is a perspective view of the rearward end of the ride platform showing the transverse support pins for securement to the truck latching mechanisms.

Cooperating with truck 51 for raising and lowering the rear end of the platform is a block and tackle, shown most clearly in FIGS. 21 and 22. Tackle or tackle line 305 which has one end secured to pulley block 306 at the underside of truck floor 271, and the other end of tackle 305 passing about pulley block 307 through a central aperture 308 in the truck floor and over a roller 310 to a suitable winch, such as winch 55 on the rear frame of tractor 50. For releasably securing pulley block 307 to the platform there is centrally provided on rear crossbeam 275 a socket 311 which is formed generally of a rearwardly opening generally U-shaped base plate 312 having the arms thereof supported by the spaced triangular brace plates 313. The rearwardmost ends of the arms of the U-shaped base plate 312 are provided on the underside thereof with stoppers 315, the arrangement being such that the standards 316 of pulley block 307 are receivable between the arms of U-shaped base plate 312, while the pulley base 317 is retained against the underside of the socket base plate 312 by the stoppers 315 as long as tackle 305 exerts an upward force on pulley block 307.

The tractor utilized in the present invention is generally conventional but provided with a roller at the rearmost end thereof over which the cable from winch 55 rides as it raises or lowers the forward end of the platform, being secured to the eye on the front cross beam thereof.

*Folding Procedure*

Considering now the sequence of steps in folding the amusement ride of the present invention, it being understood that the unfolding or "setting up" operation would be substantially the same but in reverse order, the engine is operated until overhead sweep 26 is forwardly aligned with the platform. The passenger car sweep assemblies are then folded so that the sweep arms of each are vertically coplanar. For example, in car sweep assembly 35, the vertically positionable sweep arms 206 and 208 are lifted upwardly out of locking engagement with base 202 by securing a lifting line 236 (see FIG. 13) to hook 237 on collar 230. With this action, roller 228 of sweep arm 208, along with a similar roller on sweep arm 206, rides upwardly on sleeve 204. As sweep arms 206 and 208 reach the upper end of sleeve 204, the rollers move onto bushing 238, whereupon, further movement causes abutment of the upper side of the innermost end of the sweep arms with the bushing shoulder 239 so as to urge the bushing upwardly.

Upon clearing the upper end of spider 220, the sweep arms 206 and 208 are rotated a quarter circle, with the rollers thereof resting on bushing 238 which rotates therewith. The sweep arms are then lowered into locking engagement with spider 220, the result being that the sweep arms 206 and 208 are now vertically coplanar with sweep arms 205 and 207. The sweep arms of car sweep assembly 35, whcih are now in single vertical plane, are rotated into alignment with base sweep 31. Sweep assemblies 42 and 44 are similarly folded and aligned with their base sweeps 30 and 32, respectively. Each foot guard 266 is next swung into its respective car, being secured therein by the safety door 260, so as to reduce the overall space requirement of each car, and permit the spacing between sweep assemblies to be minimized when in folded configuration.

Figure 16:
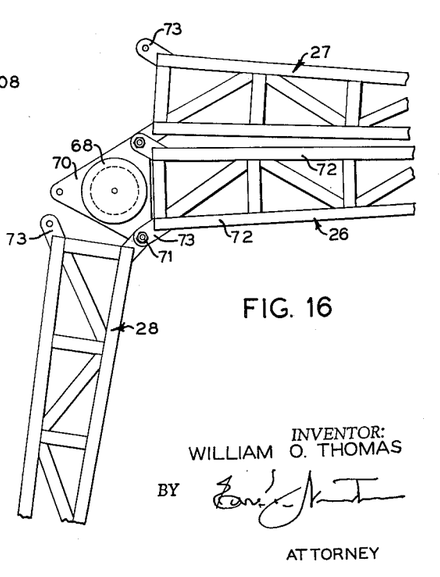
FIG. 16 is a detail top plan view, partly broken away, showing how the overhead sweeps may be folded to permit transportation of the ride.

Overhead sweeps 27 and 28, along with their companion base sweeps 31 and 32, respectively, are next folded to lie adjacent and substantially parallel with the companion overhead and base sweeps 26 and 30, respectively, as understood most clearly from FIGS. 8 and 16. For this purpose, pins, as at 71, which are common to the upper and lower chords of overhead sweeps 27 and 28, are removed. In like manner, pin 116, common to the base sweeps 31 and 32 is removed. Drive shafts 150 and 151 in base sweeps 31 and 32, respectively, are then decoupled from their drive pinions, as at 152, thereby permitting overhead sweep 27, its companion base sweep 31, and its car sweep assembly 35 to be pivoted about post 25 to a position over platform 45 adjacent the overhead and base sweeps 26 and 30, respectively. Similarly, overhead and base sweeps 28 and 32, along with the car sweep assembly 44 therebetween, are swung to a position over platform 45. The platform extension base 47 is then pivoted to a position adjacent the passenger cars.

The truck 51 is next rolled up to the rear of the platform 45. The floor 271 of truck 51 is tilted forwardly and the keepers 272 are latched on the platform support pins 281. Pulley block 307 is next secured in the platform socket 311 and tackle line 305 drawn tight as by winch 55 on the rear of tractor 50. Platform 45 thereupon raises into alignment with truck floor 271, with the platform support pins 280 being received within the opened keepers 274. The levers 301 are next manipulated so as to permit the hook plates 303 to swing closed on the pins 280 in their respective keepers 274, and locked in closed position.

After raising and securing the rearward end of the platform to truck 51, the tractor may thereafter be driven around to the forward end of the platform. A line may then be secured from winch 55 to eye 321 on the front crossbeam of the platform, passing over roller 320 on the rear of the tractor. Upon operation of winch 55, the forward end of the platform is raised and drawn over the rear of the tractor, until the tractor trailer coupling 53 latches, thereby completing the raising operation. Upon hooking up suitable brake and light quick-disconnect lines, the unit is then prepared for transportation to the next location as readily as a conventional tractor-trailer.

In the practice of the invention it will be recognized that suitable tie-down lines would be desirable for the overhead and base sweeps when folded over the platform. In addition, for display purposes electric lines may be provided up through the center post to energize lights secured along the overhead sweeps, merely by the provision of slip rings on standard 62, as is well understood by those skilled in the art. Also, truck 51 may be provided with spaced support members, as at 320' and 321', to retain therebetween sections of fencing to be placed around the ride for safety purposes when in operation.

It can be seen that the foregoing construction greatly reduces the "setting up" and "tearing down" time as well as the number of men necessary for these operations. An embodiment of the present invention having a seating capacity of thirty-six adults or forty-eight children built according to the foregoing specification has been set up in 40 to 45 minutes by two men. It will be apparent, then, that I have provided a new and improved amusement ride which is well adapted to fulfill the aforestated objects of the invention. Moreover, whereas the invention has been described with respect to a preferred embodiment thereof, it will be apparent to those skilled in the art to which the invention most nearly appertains that further embodiments and modifications thereof may be resorted to without departing from the spirit or scope of the invention as defined by the appended claims.

I claim:

1. In an amusement ride, a platform, an upwardly extending standard supported on said platform, a sleeve rotatably supported on said standard, a plurality of overhead sweeps, and means to support said sweeps in cantilever fashion from the upper end of said sleeve so as to be in a balanced configuration, said means being such as to permit said sweeps to be moved to lie adjacent and substantially parallel with one another.

2. In an amusement ride, a platform, an upwardly extending standard supported on said platform, a sleeve rotatably supported on said standard, three equally spaced overhead sweeps, and means to support said overhead sweeps from the upper end of said sleeve in a cantilever fashion, said means being such as to permit two of said three overhead sweeps to be pivotable to lie adjacent and substantially parallel to the third of said overhead sweeps.

3. In an amusement ride, an upwardly extending standard, means to support said standard, a sleeve, means rotatably supporting said sleeve on said standard, three equally spaced overhead sweeps, three equally spaced base sweeps, a first means securing said overhead sweeps to the upper end of said sleeve, and a second means securing said base sweeps to the lower end of said sleeve, said first means being such as to permit two of said three overhead sweeps to be pivotable to lie substantially parallel to the third one of said overhead sweeps, said second means being such as to permit two of said three base sweeps to be pivotable to lie substantially parallel to the third one of said base sweeps.

4. In an amusement ride, a platform, an upwardly extending standard supported on said platform, a sleeve, means rotatably supporting said sleeve from said standard, three equally spaced overhead sweeps, a first means securing said overhead sweeps to the upper portion of said sleeve, three equally spaced base sweeps, a table secured to the lower end of said sleeve, a second means securing said base sweeps to said table each in vertical registration with one of said overhead sweeps, said first means being such as to permit two of said three overhead sweeps to be pivotable to lie substantially parallel to and adjacent with the third overhead sweep, said second means being such as to permit two of said three base sweeps to be pivotable to lie substantially parallel to and adjacent with the third base sweep.

5. In an amusement ride, a platform, an upwardly extending standard supported on said platform, a sleeve, means rotatably supporting said sleeve from said standard, three equally spaced overhead sweeps, a first means securing said overhead sweeps from the upper portion of said sleeve, three equally spaced base sweeps, a table secured to the lower end of said sleeve, a second means securing said base sweeps to said table each in vertical registration with one of said overhead sweeps, said first means being such as to permit two of said three overhead sweeps to be selectively pivotable to lie substantially parallel with the third overhead sweep, said second means being such as to permit two of said three base sweeps to be selectively pivotable to lie substantially parallel with the third base sweep, and a plurality of passenger car sweep assemblies each secured between the outer ends of one of said overhead sweeps and the base sweep therebelow.

6. In an amusement ride, a platform, an upwardly extending standard supported on said platform, a sleeve, means rotatably supporting said sleeve from said standard, three equally spaced overhead sweeps, a first means securing said overhead sweeps from the upper portion of said sleeve, three equally spaced base sweeps, a table secured to the lower end of said sleeve, a second means securing said base sweeps to said table each in vertical registration with one of said overhead sweeps, said first means being such as to permit two of said three overhead sweeps to be pivotable to lie substantially parallel with the third overhead sweep, said second means being such as to permit two of said three base sweeps to be pivotable to lie substantially parallel with the third base sweep, an engine mounted on said table, a ring gear mounted on said platform, a pinion in meshing engagement with said ring gear, and means coupling rotation of said engine to said pinion so as to drive said table with respect to said platform.

7. In an amusement ride, a platform, an upwardly extending standard supported on said platform, a sleeve, means rotatably supporting said sleeve from said standard, three equally spaced overhead sweeps, a first means securing said overhead sweeps from the upper portion of said sleeve, three equally spaced base sweeps, a table secured to the lower end of said sleeve, a second means securing said base sweeps to said table each in vertical registration with one of said overhead sweeps, said first means being such as to permit two of said three overhead sweeps to be pivotable to lie substantially parallel with the third overhead sweep, said second means being such as to permit two of said three base sweeps to be pivotable to lie substantially parallel with the third base sweep, an engine mounted on said table, a ring gear mounted on said platform, a pinion in meshing engagement with said ring gear, means for coupling rotation of said engine to said pinion so as to drive said table with respect to said ring gear, a plurality of car sweep assemblies each secured between the outer ends of one of said overhead sweeps and one of said base sweeps, and means for coupling rotation of said table with respect to said platform to each of said car sweep assemblies.

8. In an amusement ride, a passenger car sweep assembly comprising, a pole, means supporting said pole in upright position, a sleeve on said pole, a first set of opposing sweep arms, means securing fast said first set of sweep arms to the lower end of said sleeve, a second set of sweep arms, a passenger car secured to each of said sweep arms, means to selectively support said second set of sweep arms from the lower end of said sleeve at right angles to said first set of sweep arms, and a locking support on the upper end of said sleeve, said second set of sweep arms being securable in said locking support in substantially the same vertical plane as said first set of sweep arms.

9. In an amusement ride, a passenger car sweep assembly comprising, a pole, means supporting said pole in upright position, a sleeve on said pole, a first car sweep having passenger cars at each end thereof, a second car sweep having passenger cars at each end thereof, a locking base at the lower end of said sleeve, a locking spider at the upper end of said sleeve, said first car sweep being secured to said locking base and to the upper end of said sleeve, a collar on said pole, said second car sweep being detachably supported from said locking base and secured to said collar, said second car sweep being raisable from a locked position at right angles to said first car sweep to a locked position in said locking spider at the upper end of said sleeve in substantially the same vertical plane as said first car sweep.

10. In an amusement ride, a passenger car sweep assembly comprising, a pole, means supporting said pole in upright position, a sleeve on said pole, a first car sweep having passenger cars at each end thereof, a second car sweep having passenger cars at each end thereof, a locking base at the lower end of said sleeve, a locking spider at the upper end of said sleeve, said first car sweep being secured to said locking base and to the upper end of said sleeve, a collar on said pole, said second car sweep being detachably supported from said locking base and secured to said collar, said second car sweep being raisable from a locked position at right angles to said first car sweep to a locked position in said locking spider at the upper end of said sleeve in substantially the same vertical plane as said first car sweep, a friction facing on the underside of said locking base, and means for rotatably driving said locking base by engagement with said friction facing.

11. In an amusement ride, a pole, means supporting said pole in upright position, a sleeve rotatable on said pole, a first car sweep having passenger cars at each end thereof, said first car sweep being secured to said sleeve, a movable collar on said pole above said sleeve, a second car sweep having passenger cars at each end thereof, said second car sweep being secured to said collar, said sleeve having a locking base, said second car sweep being releasably securable to said locking base at substantially right angles to said first car sweep, a locking spider secured to the upper end of said sleeve, said second car sweep being raisable to said spider for locking therewith in a substantially vertical plane with said first car sweep.

12. Apparatus as set forth in claim 11 wherein said second car sweep has opposing radial sweep arms, each of said arms having a roller at the innermost radial end thereof in rolling registration with said sleeve as said second car sweep is raised to said spider.

13. Apparatus as set forth in claim 11 wherein said locking base and said locking spider each have a wedge member to insure positive locking of said second car sweep therewith.

14. Apparatus as set forth in claim 12 wherein a bushing having substantially the same diameter as said sleeve is on said pole between said sleeve and said collar, said bushing having a shoulder at the upper end thereof, the arrangement being such that upon upward movement of said second car sweep above said spider said bushing moves therewith, whereby said second car sweep may be rotated about said pole with said rollers supported on said bushing.

15. In an amusement ride, a trailer platform, an upwardly extending standard supported on said platform, a sleeve rotatably supported from said standard, a plurality of overhead sweeps pivotally supported from said sleeve, a plurality of passenger car sweep assemblies each supported from one of said sweeps, each of said sweep assemblies having first and second sets of passenger car sweep arms, each of said car sweep assemblies further having means releasably securing said first set of sweep arms in a vertically coplanar position with respect to said second set of sweep arms so as to be disposed in a folded configuration, said first and second set of sweep arms being unfoldable so as to be at right angles to each other in a substantially horizontal plane, said overhead sweeps being foldable to be substantially parallel to each other over said trailer platform with each of said folded passenger car sweep assemblies in vertically coplanar relation with its overhead sweep, a truck, means for releasably securing said truck to one end of said platform, a tractor, and means for pivotally securing said tractor to the other end of said platform.

16. In an amusement ride, a trailer platform, a truck for detachably supporting one end of said platform, wheels connected to said truck by which the platform and truck are transported, an upwardly extending standard supported on said platform, a sleeve rotatably supported on said standard, a plurality of horizontally disposed overhead sweeps, and means to support said sweeps in cantilever fashion from the upper end of said sleeve so as to be in a balanced configuration, and means adjacent said sleeve for selectively positioning said sweeps in fixed positions radially with respect to said sleeve and permitting said sweeps to pivot horizontally and lie adjacent and substantially parallel with one another.

17. In an amusement ride, a trailer platform, a truck for detachably supporting one end of said platform, wheels connected to said truck by which the platform and truck are transported, an upwardly extending standard supported on said platform, a sleeve rotatably supported on said standard, three equally spaced horizontally disposed overhead sweeps, and means to support said overhead sweeps from the upper end of said sleeve in a cantilever fashion, and means adjacent said sleeve for selectively positioning said sweeps in fixed positions radially with respect to said sleeve and permitting two of said three overhead sweeps to be pivotable horizontally to lie adjacent and substantially parallel to the third of said overhead sweeps.

18. In an amusement ride, a trailer platform, wheels connected to said platform by which the platform is transported, an upwardly extending standard supported from said platform, a sleeve, means rotatably supporting said sleeve coaxially on said standard, a first triangular plate secured to the upper end of said sleeve, a second triangular plate secured to said sleeve spaced downwardly from said first triangular plate, first, second and third sweeps, each of said sweeps, each of said sweeps being of cantilever construction and having upper and lower pairs of chords, said upper pair of chords of each sweep being secured to adjacent apexes of the upper triangular plate, said lower pair of chords of each sweep being secured to adjacent apexes of the lower triangular plate, the arrangement being such that one of each pair of upper chords in each sweep is secured to the same apex in said upper triangular plate, and one of each pair of lower chords in each sweep is secured to the same apex in said lower triangular plate, and securing means at each apex of each triangular plate for securing said chords thereto.

19. Apparatus as set forth in claim 18 wherein one of said securing means in each of said triangular plates is removable so as to permit said first and second sweeps to be pivoted to lie substantially parallel to and adjacent said third sweep.

20. In an amusement ride, a trailer platform, removable wheels connected to the ends of said platform by which the platform is transported whereby when said wheels are removed from said platform, said platform may rest upon the ground, an upwardly extending standard supported by said platform, means to support said standard, a sleeve, means rotatably supporting said sleeve on said standard, three equally spaced horizontally disposed overhead sweeps, three equally spaced base sweeps, a first means securing said overhead sweeps to the upper end of said sleeve, and a second means securing said base sweeps to the lower end of said sleeve, said first means being such as to permit two of said three overhead sweeps to be pivotable to lie substantially parallel to the third one of said overhead sweeps, said second means being such as to permit two of said three base sweeps to be pivotable horizontally to lie substantially parallel to the third one of said base sweeps.

21. In an amusement ride, a trailer platform, removable wheels connected to the ends of said platform by which the platform is transported whereby when said wheels are removed from said platform, said platform may rest upon the ground, an upwardly extending standard supported on said platform, a sleeve, means rotatably supporting said sleeve from said standard, three equally spaced horizontally disposed overhead sweeps, a first means securing said overhead sweeps from the upper portion of said sleeve, three equally spaced base sweeps, a table secured to the lower end of said sleeve, a second means securing said base sweeps to said table each in vertical registration with one of said overhead sweeps, said first means being such as to permit two of said three overhead sweeps to be pivotable to lie substantially parallel to and adjacent with the third overhead sweep, said second means being such as to permit two of said three base sweeps to be pivotable horizontally to lie substantially parallel to and adjacent with the third base sweep.

22. In an amusement ride, a trailer platform, removable wheels connected to the ends of said platform by which the platform is transported whereby when said wheels are removed from said platform, said platform may rest upon the ground, an upwardly extending standard supported on said platform, a sleeve, means rotatably supporting said sleeve from said standard, three equally spaced horizontally disposed overhead sweeps, a first means securing said horizontally disposed overhead sweeps from the upper portion of said sleeve, three equally spaced base sweeps, a table secured to the lower end of said sleeve, a second means securing said base sweeps to said table each in vertical registration with one of said overhead sweeps, said first means being such as to permit two of said three overhead sweeps to be selectively pivotable to lie substantially parallel with the third overhead sweep, said second means being such as to permit two of said three base sweeps to be selectively pivotable to lie substantially parallel with the third base sweep, and a plurality of passenger car sweep assemblies each secured between the outer ends of one of said overhead sweeps and the base sweep therebelow.

23. In an amusement ride, a trailer platform, removable wheels connected to the ends of said platform by which the platform is transported whereby when said wheels are removed from said platform, said platform may rest upon the ground, an upwardly extending standard supported on said platform, a sleeve, means rotatably supporting said sleeve from said standard, three equally spaced horizontally disposed overhead sweeps, a first means securing said horizontally disposed overhead sweeps to the upper portion of said sleeve, three equally spaced base sweeps, a table secured to the lower end of said sleeve, a second means securing said base sweeps to said table each in vertical registration with one of said overhead sweeps, said first means being such as to permit two of said three overhead sweeps to be pivotable to lie substantially parallel with the third overhead sweep, said second means being such as to permit two of said three base sweeps to be pivotable to lie substantially parallel with the third base sweep, an engine mounted on said table, a ring gear mounted on said platform, a pinion in meshing engagement with said ring gear, and means coupling rotation of said engine to said pinion so as to drive said table with respect to said platform.

24. In an amusement ride, a trailer platform, wheels connected to said platform by which the platform is transported, an upwardly extending standard supported on said platform, a sleeve, means rotatably supporting said sleeve from said standard, three equally spaced overhead sweeps, a first means securing said overhead sweeps to the upper portion of said sleeve, three equally spaced base sweeps, a table secured to the lower end of said sleeve, a second means securing said base sweeps to said table each in vertical registration with one of said overhead sweeps, said first means being such as to permit two of said three overhead sweeps to be pivotable to lie substantially parallel with the third overhead sweep, said second means being such as to permit two of said three base sweeps to be pivotable to lie substantially parallel with the third base sweep, an engine mounted on said table, a ring gear mounted on said platform, a pinion in meshing engagement with said ring gear, means for coupling rotation of said engine to said pinion so as to drive said table with respect to said ring gear, a plurality of car sweep assemblies each secured between the outer ends of one of said overhead sweeps and one of said base sweeps, and means for coupling rotation of said table with respect to said platform to each of said car sweep assemblies.

25. In an amusement ride, a flat trailer platform, wheels removably connected to said platform by which the platform is transported, said wheels when removed permitting said platform to rest upon the ground, an upwardly extending standard supported on said platform, a sleeve, means rotatably supporting said sleeve coaxially on said standard, an overhead sweep, means pivotally securing said overhead sweep to the upper end of said sleeve, a table secured to the lower end of said sleeve, a base sweep pivotally secured to said table in the same vertical plane as said overhead sweep, a car sweep assembly rotatably supported between the outer ends of said overhead sweep and said base sweep, an engine supported on said table, a ring gear mounted on said platform coaxially with said sleeve, a pinion in meshing engagement with said ring gear, means for coupling rotation of said engine to said pinion so as to rotate said table with respect to said ring gear, driving means for rotating said sweep assembly, and means for coupling rotation of said table with respect to said ring gear to said driving means.

26. Apparatus as set forth in claim 25 wherein said driving means includes a friction coupling unit.

27. Apparatus as set forth in claim 25 wherein said means for coupling rotation of said table with respect to said ring gear includes a drive shaft rotatably supported in said base sweep and connected to said sweep assembly driving means, and means for detachably coupling said drive shaft to said pinion.

28. In an amusement ride, a trailer platform, wheels removably connected to said platform by which the platform is transported, said wheels when removed permitting said platform to rest upon the ground, an upwardly extending standard supported on said platform, a sleeve, means rotatably supporting said sleeve coaxially on said standard, an overhead sweep, means securing said overhead sweep to the upper end of said sleeve, a table secured to the lower end of said sleeve, a base sweep secured to said table in the same vertical plane as said overhead sweep, an engine supported on said table, a ring gear supported on said platform coaxially with said sleeve, a pinion in meshing engagement with said ring gear, means for coupling rotation of said engine to said pinion so as to drive said table with respect to ring gear, a car sweep assembly rotatably supported between the outer ends of said overhead sweep and said base sweep, driving means for rotating said car sweep assembly, a drive shaft supported by said base sweep and connected to said driving means, and universal joint means for coupling rotation of said pinion to said drive shaft.

29. Apparatus as set forth in claim 28 wherein said driving means includes a friction coupling unit.

30. In an amusement ride, a trailer platform, wheels connected to said platform by which the platform is transported, an upwardly extending standard supported on said platform, a sleeve, means rotatably supporting said sleeve coaxially on said standard, a table secured to the lower end of said sleeve, an engine supported on said table, a ring gear secured to said platform coaxially with said sleeve, a first pinion in meshing engagement with said ring gear, means for coupling rotational output of said engine to said first pinion so as to rotate said table with respect to said ring gear, a second pinion in meshing engagement with said ring gear, means rotatably supporting said second pinion from said table so that rotation of said table with respect to said ring gear effects rotation of said second pinion, a third pinion in meshing engagement with said ring gear, means rotatably supporting said third pinion from said table so that rotation of said table with respect to said ring gear effects rotation of said third pinion, said pinions being equally spaced about said ring gear, and car sweep assemblies carried by said sleeve and respectively connected to said pinions for rotation with said sleeve and individual rotation by said pinions about axes radially spaced from said sleeve.

31. In an amusement ride, a trailer platform, wheels connected to said platform by which the platform is transported, an upwardly extending standard supported on said platform, a sleeve, means rotatably supporting said sleeve from said standard, a table secured to the lower end of said sleeve, an engine supported on said table, a ring gear secured on said platform concentrically with said sleeve, a pinion adapted for meshing engagement with said ring gear, means for coupling the output of said engine to said pinion so as to drive said table with respect to said platform, and a car sweep assembly carried by said sleeve for rotation therewith and connected to said pinion for rotation thereby about an axis spaced radially from said sleeve.

32. In an amusement ride, a trailer platform, wheels connected to said platform by which the platform is transported, an upwardly extending standard supported on said platform, a sleeve, means rotatably supporting said sleeve from said standard, a table secured to the lower end of said sleeve, an engine supported on said table, a ring gear secured on said platform concentrically with said sleeve, a pinion adapted for meshing engagement with said ring gear, means for coupling the output of said engine to said pinion so as to drive said table with respect to said platform, a selectively operable engine control member mounted on said platform, a central rod extending upwardly through the center of said standard, means to convert movement of said control member into vertical movement of said central rod, means to control said engine including an upright control rod rotatable with said engine outside of said sleeve, and means to couple vertical movement of said central rod to vertical movement of said control rod.

33. In an amusement ride, a trailer platform, wheels connected to said platform by which the platform is transported, an upwardly extending standard supported on said platform, a sleeve, foldable horizontal sweeps carried by said sleeve, means rotatably supporting said sleeve from said standard, a table secured to the lower end of said sleeve, an engine supported on said table, a ring gear secured on said platform concentrically with said sleeve, a pinion in meshing engagement with said ring gear, means for coupling the output of said engine to said pinion so as to drive said table with respect to said platform, a selectively operable engine control member mounted on said platform, a central rod extending upwardly through the center of said standard, means to convert movement of said control member into vertical movement of said central rod, means to control said engine including an upright control rod rotatable with said engine outside of said sleeve, and a swivel supported by said sleeve, said central rod being secured to one end of said swivel, said control rod being secured on the other end of said swivel, whereby vertical movement of said central rod effects vertical movement of said control rod even though said control rod is rotatable with said engine.

34. In an amusement ride, a trailer platform, wheels connected to said platform by which the platform is transported, an upwardly extending standard supported from said platform, a sleeve, foldable horizontal sweeps carried by said sleeve, means rotatably supporting said sleeve from said standard, a table supported from the lower end of said sleeve, an engine supported on said table, a fluid coupling unit supported on said table, means for coupling the output of said engine to said fluid coupling unit, a brake mechanism supported on said table for reducing the output of said fluid coupling unit, a ring gear supported on said platform concentrically with said sleeve, a pinion in meshing engagement with said ring gear, a right angle drive unit supported on said platform connected to said pinion, means for connecting the output of said fluid coupling unit to said right angle drive unit so as to drive said table with respect to said ring gear, a gas feed linkage for controlling the output of said engine, and a single rod control mechanism connected to said gas feed linkage and said brake mechanism.

35. In an amusement ride, a trailer platform, wheels connected to said platform by which the platform is transported, an upwardly extending standard supported on said platform, a sleeve, foldable horizontal sweeps carried by said sleeve, means rotatably supporting said sleeve from said standard, a table secured to the lower end of said sleeve, an engine supported from said table, a fluid coupling unit supported from said table, means for coupling the output of said engine to said fluid coupling unit, a ring gear supported on said platform concentrically with said sleeve, a pinion in meshing engagement with said ring gear, a right angle drive unit supported on said platform connected to said pinion, braking means for limiting rotational output of said fluid coupling unit, a gas feed linkage for said engine, means to actuate said braking means and said gas feed mechanism including a rod adapted for vertical movement, said rod extending upwardly outside said sleeve, a top plate on said sleeve, a swivel mounted on said top plate, said outside rod connected to one side of said swivel, a center rod connected to the other side of said swivel, said center rod extending downwardly through said standard to below said sleeve, and means to manually control the vertical position of said center rod.

36. Apparatus as set forth in claim 35 including a bell crank supported from said platform and having one end connected to said center control rod, a slave pneumatic cylinder having a plunger secured to the other end of said bell crank, a pivotal base on one end of said platform, an operator's chair on said base, a master pneumatic cylinder in said base, means to operatively connect said master cylinder to said slave cylinder, and a control handle supported on said pivotal base adjacent said operator's chair for operating said master cylinder.

37. In an amusement ride, a platform, a standard supported from said platform, a sleeve, means rotatably supporting said sleeve coaxially on said standard, a first triangular plate secured to the upper end of said sleeve, a second triangular plate secured to said sleeve spaced downwardly from said first triangular plate, first, second and third sweeps, each of said sweeps being of cantilever construction and having upper and lower pairs of chords, said upper pair of chords of each sweep being secured to adjacent apexes of the upper triangular plate, said lower pair of chords of each sweep being secured to adjacent apexes of the lower triangular plate, the arrangement being such that one of each pair of upper chords in each sweep is secured to the same apex in said upper triangular plate, and one of each pair of lower chords in each sweep is secured to the same apex in said lower triangular plate, and securing means at each apex of each triangular plate for securing said chords together, one of said securing means in each of said triangular plates being removable so as to permit said first and second sweeps to be pivoted to lie substantially parallel to and adjacent said third sweep.

References Cited in the file of this patent

UNITED STATES PATENTS

| | | |
|---|---|---|
| 1,451,605 | Adelson et al. | Apr. 10, 1923 |
| 1,605,687 | Morris | Nov. 2, 1926 |
| 1,631,331 | Pinto | June 7, 1927 |
| 2,109,972 | Meyer | Mar. 1, 1938 |
| 2,259,691 | Harris | Oct. 21, 1941 |
| 2,522,934 | Engnell et al. | Sept. 19, 1950 |
| 2,571,512 | Youngberg | Oct. 16, 1951 |
| 2,590,934 | Catlett | Apr. 1, 1952 |
| 2,596,722 | Quayle | May 13, 1952 |
| 2,779,602 | Kimbro et al. | Jan. 29, 1957 |
| 2,826,242 | Thompson | Mar. 11, 1958 |
| 2,833,338 | Fidel | May 6, 1958 |
| 2,847,216 | Courtney | Aug. 12, 1958 |
| 2,861,811 | Lassen | Nov. 25, 1958 |
| 2,864,615 | Castille | Dec. 16, 1958 |